United States Patent [19]

Peschka et al.

[11] Patent Number: 5,365,981
[45] Date of Patent: Nov. 22, 1994

[54] METHOD AND REFUELLING MEANS FOR FILLING A CRYOTANK

[75] Inventors: Walter Peschka, Sindelfingen; Gottfried Schneider, Stuttgart, both of Germany

[73] Assignee: Deutsche Forschungsanstalt fuer Luft- und Raumfahrt e.V., Bonn, Germany

[21] Appl. No.: 932,066

[22] Filed: Aug. 19, 1992

[30] Foreign Application Priority Data

Aug. 31, 1991 [DE] Germany .............................. 4129020

[51] Int. Cl.⁵ .............................................. B67D 5/06
[52] U.S. Cl. ................................................ 141/7; 141/5;
141/11; 141/45; 141/82; 62/50.1; 62/54.1;
123/DIG. 12
[58] Field of Search ........................................ 141/1–5,
141/7, 11, 44, 45, 51, 59, 82, 98; 62/50.1, 50.7,
53.2, 54.1, 55.5; 123/541, DIG. 12

[56] References Cited

U.S. PATENT DOCUMENTS

| | | |
|---|---|---|
| 3,687,176 | 8/1972 | Fernandes et al. .................. 141/59 |
| 3,962,882 | 6/1976 | Gee et al. .............................. 62/50.1 |
| 4,010,623 | 3/1977 | Kaschak ................................ 141/82 X |
| 4,475,348 | 10/1984 | Remes ................................... 62/50.4 |
| 4,608,830 | 9/1986 | Peschka et al. .................... 62/50.1 X |
| 4,887,857 | 12/1989 | Van Ommeren ..................... 141/1 |
| 4,910,963 | 3/1990 | Vanzo .................................. 62/50.1 X |
| 5,154,062 | 10/1992 | Gaumer, Jr. et al. ................ 62/54.1 |
| 5,220,801 | 6/1993 | Butler et al. ......................... 62/54.1 |

FOREIGN PATENT DOCUMENTS

| | | |
|---|---|---|
| 495795 | 4/1930 | Germany . |
| 3344770 | 6/1985 | Germany . |
| 1167883 | 10/1969 | United Kingdom . |

*Primary Examiner*—J. Casimer Jacyna
*Attorney, Agent, or Firm*—Barry R. Lipsitz

[57] ABSTRACT

In order to improve a method for filling a cryotank with liquid hydrogen, in which thermal energy is introduced into the liquid hydrogen by the transfer of the liquid hydrogen to the cryotank, such that the amount of gas which results during filling of a cryotank and is carried away via the gas return line is reduced to as great an extent as possible, preferably to zero, it is suggested that for filling hydrogen be used at a pressure and a temperature corresponding to an undercooled state of the liquid hydrogen.

12 Claims, 1 Drawing Sheet

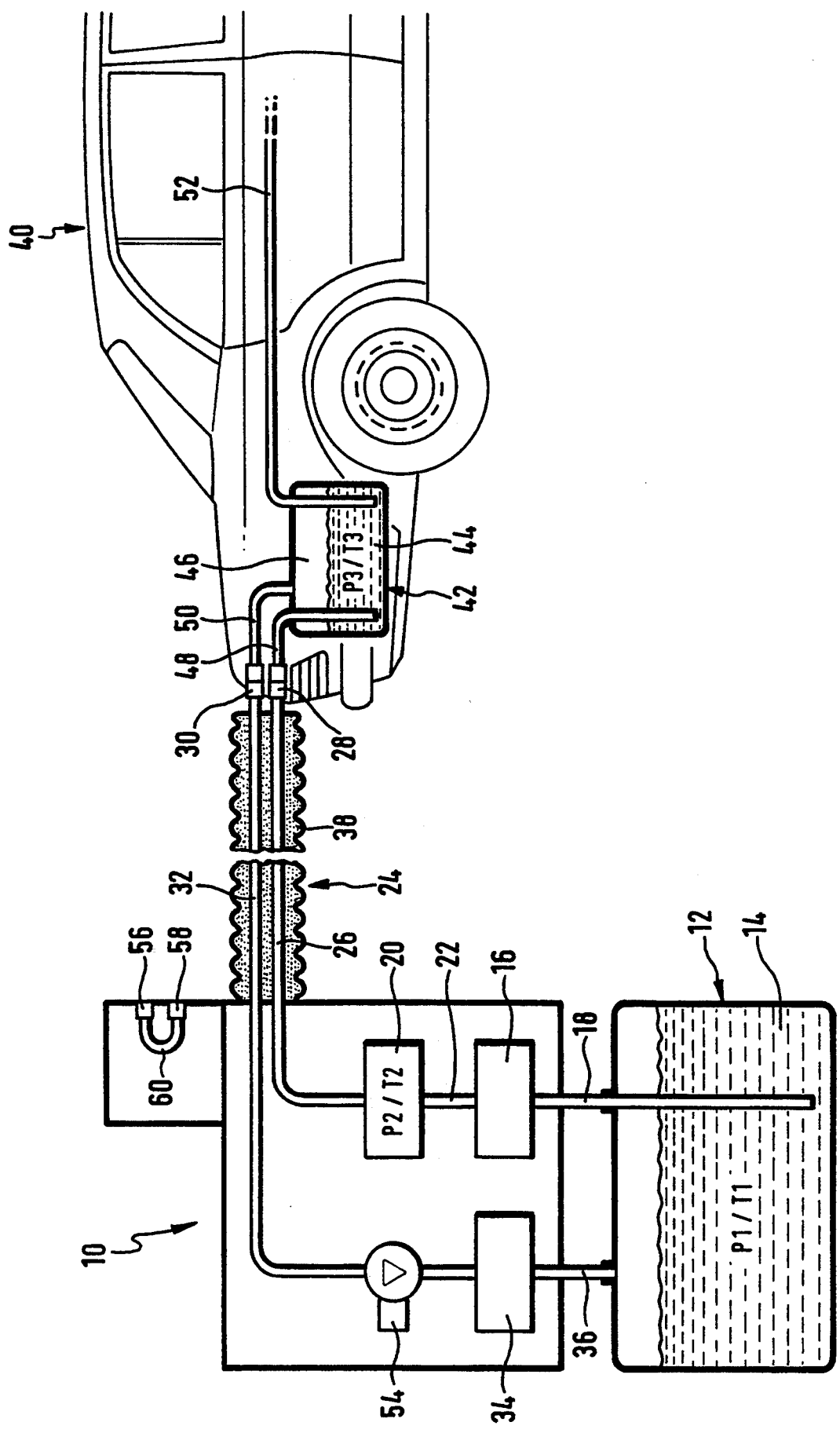

METHOD AND REFUELLING MEANS FOR FILLING A CRYOTANK

BACKGROUND OF THE INVENTION

The invention relates to a method and a refuelling means for filling a cryotank with liquid hydrogen, in which thermal energy is introduced into the liquid hydrogen by the transfer of the liquid hydrogen to the cryotank.

DE-PS 33 44 770 discloses a method and an apparatus for filling a cryotank with liquid hydrogen, which operate using two lines, one line supplying the liquid hydrogen and the other line carrying off the gas resulting from the filling of the cryotank.

In the known method and the known refuelling means, the speed with which the cryotank can be filled is limited by the fact that the resulting gas has to be taken off.

The object underlying the invention is therefore to improve a method and a refuelling apparatus of the generic type such that the amount of gas which results during filling of a cryotank and is carried away via the gas return line is reduced to as great an extent as possible, preferably to zero.

SUMMARY OF THE INVENTION

This object is accomplished in accordance with the invention, for a method of the type described above, in that for filling hydrogen is used at a pressure and a temperature corresponding to an undercooled state of the liquid hydrogen.

The undercooled state of the liquid hydrogen is to be understood as hydrogen having pressure and temperature values which do correspond to the values defined by the boiling-point curve in the equilibrium diagram but rather to values which are below these in the liquid phase.

Due to this measure, it is possible in accordance with the invention for the hydrogen to still absorb additional thermal energy during filling without the entire thermal energy introduced into the hydrogen resulting to its full extent in the formation of gas.

Particularly advantageous is an inventive method, in which the undercooling is selected such that the thermal energy introduced into the hydrogen during filling of the tank heats the hydrogen at the most up to its thermodynamic state of equilibrium.

This measure ensures that the entire thermal energy introduced into the liquid hydrogen during filling does not lead to the formation of gas but merely heats the hydrogen in the undercooled state at the most to such an extent that this is then in its thermodynamic state of equilibrium.

Particularly when the suppression of the formation of gas is intended to be ensured, it is advantageous for the hydrogen in the cryotank to be at a pressure and a temperature corresponding to the undercooled state of the liquid hydrogen.

A further possibility of transferring hydrogen in the undercooled state of the liquid hydrogen to the cryotank is for the hydrogen to be transferred to the cryotank in the form of hydrogen sludge. The hydrogen sludge consists of a mixture of solid and liquid hydrogen which has a temperature corresponding to the melting point of the solid hydrogen. A hydrogen sludge of this type can also be pumped in a simple manner and has, in addition, the great advantage that the thermal capacity thereof and the density thereof are considerably higher. Such a use of hydrogen sludge is recommendable, in particular, when a great deal of thermal energy is introduced during filling of the cryotank since this hydrogen sludge can absorb a great amount of thermal energy without forming any gas. Furthermore, the use of hydrogen sludge has the additional advantage that the hydrogen sludge has a greater density and, therefore, more hydrogen can be stored for the same tank volume.

In an additional, advantageous and particularly simple embodiment of the inventive method, the hydrogen is undercooled by means of a cooling unit before being transferred to the cryotank. This enables, for example, the hydrogen to be cooled prior to entering the liquid hydrogen line to such an extent that this can absorb the thermal energy fed thereto along the course of the liquid hydrogen line without any gas being formed.

In a further, advantageous embodiment, the hydrogen is transferred to the cryotank by means of a liquid hydrogen pump.

The liquid hydrogen pump offers the possibility of achieving an undercooled state of the liquid hydrogen in the most simple manner, namely by increasing the pressure to which the hydrogen is subject.

For this reason, in a particularly preferred embodiment, the liquid hydrogen transferred to the cryotank during filling thereof is at a pressure above atmospheric pressure. It is, therefore, possible, for example proceeding on the basis of liquid hydrogen subject to atmospheric pressure, to attain a thermodynamically undercooled state of the hydrogen simply by subjecting this hydrogen to a greater pressure since the temperature of the hydrogen remains the same without any supply of thermal energy.

In this respect, it is particularly advantageous for the pressure in the cryotank during transfer of the hydrogen thereto to be increased such that this corresponds at the end of the refuelling process to a pressure required for direct operation of an engine. This inventive solution offers, on the one hand, the advantage of attaining the undercooled state of the liquid hydrogen in a very simple manner and, on the other hand, the advantage that immediately after the refuelling process the required pressure is available in the cryotank to, for example, be able to operate an engine with the hydrogen in the cryotank.

It is advantageous in this respect for the cryotank to be that of a motor vehicle so that the motor vehicle can drive off immediately after the refuelling process since the pressure required in the cryotank for running the engine is available after the filling of the cryotank has been completed.

In all the embodiments described above, it has preferably been assumed that the cryotank is filled when cold, i.e. still contains hydrogen.

It is particularly advantageous in a cryotank which is still cold for the pressure therein at the beginning of the refuelling process to be reduced to atmospheric pressure since this enables a temperature of the liquid hydrogen in the cryotank to be reached, in a simple manner, which corresponds subsequently, due to an increase in pressure, to a thermodynamically undercooled state of the liquid hydrogen in the cryotank.

Furthermore, it is additionally advantageous within the scope of the inventive solution for the refuelling means required to transfer the hydrogen to the cryotank to be kept constantly cold, i.e., when a cryotank is not being filled, for these means to have, for example, cold hydrogen constantly flowing through them or for them to be cooled by a cooling means provided especially for this purpose.

The inventive object is also accomplished in accordance with the invention, in a refuelling means of the type described at the outset, in that hydrogen having a pressure and a temperature corresponding to an undercooled state of the liquid hydrogen is produceable with the refuelling means for filling the cryotank.

Due to the production of such undercooled liquid hydrogen in the refuelling means it is possible to compensate also for thermal energy introduced during the filling of the cryotank and, therefore, reduce the formation of gas.

It is particularly advantageous for the hydrogen to be undercoolable with the refuelling means such that the thermal energy introduced into the hydrogen during the filling of the cryotank heats the liquid hydrogen at the most up to its thermodynamic state of equilibrium.

Furthermore, in an advantageous embodiment of the inventive refuelling means, it is possible with this means to generate a pressure in the cryotank during filling of the cryotank which, at the temperature of the liquid hydrogen in the cryotank, corresponds to an undercooled state of the liquid hydrogen.

A preferred embodiment of an inventive refuelling means is designed such that this comprises a pump subjecting the hydrogen to pressure. For safety purposes, the possibility is also expediently provided of having the hydrogen in the tank of the refuelling means acted upon by a short-term gas pressure cushion of helium and hereby of transferring the hydrogen to the cryotank even when the pump is out of action.

A further, inventive embodiment is designed for generating undercooled liquid hydrogen such that this comprises a cooling unit with which the hydrogen can be brought to a temperature corresponding to the undercooled state.

Preferably, both a cooling unit and a pump are provided in an embodiment of the inventive refuelling means. It is, however, sufficient to merely provide a pump and achieve the undercooled state by subjecting the liquid hydrogen, during filling of the cryotank, to an increased pressure.

In an additional, advantageous embodiment, in particular for the case where a large quantity of thermal energy is introduced, the refuelling means comprises a tank for storing hydrogen sludge and with this refuelling means the cryotank can be filled with hydrogen sludge.

For this case, in particular, the refuelling means comprises a pumping means for hydrogen sludge.

Moreover, in an advantageous embodiment of a refuelling means, this comprises fittings and pipes for the transfer of the hydrogen which can be cooled by the refuelling means.

Additional features and advantages of the inventive solution are the subject matter of the following description as well as of the drawing of one embodiment.

BRIEF DESCRIPTION OF THE DRAWING

The drawing shows a schematic illustration of one embodiment.

DETAILED DESCRIPTION OF THE INVENTION

An embodiment of an inventive refuelling means 10 for liquid hydrogen, as illustrated in the drawing, comprises a tank 12, in which the liquid hydrogen is stored in the form of a hydrogen bath 14.

In addition, the refuelling means 10 comprises a pump 16 with a suction line 18 leading into the hydrogen bath 14 of the tank 12, an intermediate line 22 leading from the pump 16 to a hydrogen cooling unit 20 and a liquid hydrogen line 26 which leads from the hydrogen cooling unit 20 into a refuelling pipe 24 and ends in a connecting pipe 28. Furthermore, a gas return line 32 is provided in the refuelling pipe 24. This gas return line leads back from a connecting pipe 30 and to a gas cooling means 34 which, for its part, cools returning hydrogen gas and returns this via a return line 36 to the tank 12. The hydrogen can, for example, be cooled to such an extent that this is again fed back into the hydrogen bath 14 as liquid hydrogen.

The refuelling pipe preferably comprises an insulating casing 38 which surrounds the liquid hydrogen line 26 and the gas return line 32 and leads as far as the connecting pipes 28 and 30.

With the inventive refuelling means, it is intended, for example, to refuel a motor vehicle designated as a whole as 40, which comprises a cryotank 42 in which liquid hydrogen 44 can also be stored as a bath, whereby a hydrogen gas bubble 46 of a greater or lesser size is located above the liquid hydrogen 44.

A tank feed line 48 leads into the cryotank 42 and preferably ends in a base region of the cryotank 42. Moreover, a gas return line 50 opens into this cryotank 42, preferably into the hydrogen gas bubble 46.

For filling the cryotank 42, the liquid hydrogen line 26 can be connected with the tank feed line 48 via the connecting pipe 28 and the gas return line 32 with the gas return line 50 by means of the connecting pipe 30.

For running an engine of the motor vehicle 40 which is not illustrated in the drawing, an engine feed line 52 also opens into the cryotank 42 and this supplies liquid hydrogen 44 from the cryotank to the engine.

In order to generate as little gas formation as possible during the filling of the cryotank 42, the inventive refuelling means operates such that the liquid hydrogen in the hydrogen bath 14, which has a temperature T1 at a pressure P1 in thermodynamic equilibrium, is sucked through the suction line 18 and conveyed by the pump 16 via the intermediate line 22 into the hydrogen cooling unit 20. When leaving this unit, it has a temperature T2 at a pressure P2, whereby the pressure P2 and the temperature T2 do not correspond to the values of the thermodynamic state of equilibrium of the liquid hydrogen but rather to an undercooled state, which means that the temperature T2 is lower than the temperature corresponding to the pressure P2 in accordance with the boiling-point curve in the thermodynamic equilibrium diagram.

An undercooled liquid hydrogen of this type is now introduced into the cryotank 42 via the liquid hydrogen line 26, the connecting pipe 28 and the tank feed line 48. The undercooled liquid hydrogen with the pressure P2 and the temperature T2 absorbs thermal energy as it flows through the liquid hydrogen line 26, the connecting pipe 28 and the tank feed line 48 so that, finally the liquid hydrogen 44 in the cryotank 42 has a pressure P3 (in this case equal to P2) and a temperature T3 which correspond at the most to the thermodynamic state of equilibrium or, again, an undercooled state.

In order to achieve such pairs of values P3 and T3 in the liquid hydrogen 44 of the cryotank 42, the amount of undercooling of the liquid hydrogen in the hydrogen cooling unit 20 has to be selected large enough so that the thermal energy introduced into the liquid hydrogen while it is flowing through the liquid hydrogen line 26, the connecting pipe 28 and the tank feed line 48 is not sufficient to heat this hydrogen to above the thermodynamic state of equilibrium of the liquid hydrogen in the cryotank 42.

The result of such a procedure is that despite the liquid hydrogen being heated up in the liquid hydrogen line 26, the connecting pipe 28 and the tank feed line 48 no additional gas formation occurs in the liquid hydrogen 44 and, therefore, no marked gas formation in the cryotank 42. This means that the gas return line 50 does not have any appreciable stream of hydrogen gas flowing through it and, therefore, the gas cooling means 34 also does not need to recool hydrogen gas to any appreciable extent and return this to the hydrogen bath 14. The gas return line 50 with the connecting pipe 30 and the gas return line 32 therefore serve merely to draw off the minimal gas formation in the cryotank 42 and are otherwise present for safety reasons or in order to ventilate the cryotank 42 prior to commencement of filling and to reduce the pressure in the cryotank 42.

In a further variation of the inventive refuelling means 10, the hydrogen cooling unit 20 can be dispensed with when the thermal energy introduced to the hydrogen while flowing through the liquid hydrogen line 26, the connecting pipe 28 and the tank feed line 48 is slight.

In this embodiment, the pump 16 will then increase the pressure P2 quite considerably in comparison with the pressure P1 in the hydrogen bath 14 whereas the temperature T2 after the pump will correspond approximately to the temperature T1 in the hydrogen bath. An undercooling of the liquid hydrogen is already achieved by this. If this liquid hydrogen is now introduced into the cryotank 42 via the liquid hydrogen line 26, the connecting pipe 28 and the tank feed line 48, this hydrogen will also absorb thermal energy but the heating up of the hydrogen from the temperature T2, which is approximately equal to T1, to the temperature T3 is then preferably so slight that the temperature T3 corresponds at the most to the temperature of the thermodynamic state of equilibrium corresponding to the pressure P3, which is approximately equal to the pressure P2, or is below this. This means that even if a formation of gas temporarily occurs in the liquid hydrogen line 26 or the connecting pipe 28 or tank feed line 48, this gas leads to an increase in pressure in the hydrogen gas bubble 46 and is subsequently condensed again due to the undercooled liquid hydrogen 44 so that no appreciable gas formation results. For this purpose, a slide valve 54 is provided in the gas return line 32 which remains closed.

Preferably, this embodiment is operated such that, proceeding from atmospheric pressure in the hydrogen bath 14, i.e. P1 approximately equal to 1 bar, the pump 16 generates an overpressure once filling of the cryotank 42 is completed so that P3 is at approximately 3.5 to 4 bars. This would be the optimum pressure for having an adequately high pressure available in the cryotank 42 immediately after refuelling the motor vehicle 14 to be able to run the engine right away.

In a further variation of the inventive solution, the cryotank 42 is not filled with liquid hydrogen from the hydrogen bath 14 but, instead of the hydrogen bath 14, the tank 12 contains hydrogen sludge which has a temperature corresponding to the melting point of hydrogen. This hydrogen sludge is conveyed via the suction line 18 and the pump 16 suitable for hydrogen sludge as well as the liquid hydrogen line 26, the connecting pipe 28 and the tank feed line 48 into the cryotank 42 and is mixed with the liquid hydrogen 44.

This means that the hydrogen cooling unit 20 can be dispensed with.

The use of hydrogen sludge has the advantage that this corresponds to liquid hydrogen undercooled to a very considerable degree and, moreover, has a thermal capacity which is approximately 18% above that of the liquid hydrogen and, again, has a density which is approximately 15% higher. These figures relate to a mixture of solid and liquid phase in the ratio of 50:50.

Preferably, the procedure in all the embodiments is such that the refuelling pipe 24, after the cryotank 42 has been filled, is inserted with the connecting pipes 28 and 30 into the pipes 56 and 58 of the refuelling means 10. These pipes are connected to a short-circuit line 60 and therefore allow the liquid hydrogen line 26 to be kept cold in the intervals between the filling of a cryotank in that this line has hydrogen flowing through it continuously or in intervals. This hydrogen is returned to the tank 12 via the gas return line 32.

The present disclosure relates to the subject matter disclosed in German application No. P 41 29 020.8 of Aug. 31, 1991, the entire specification of which is incorporated herein by reference.

What is claimed is:

1. A method for filling a cryotank of a hydrogen-powered vehicle with liquid hydrogen from a storage tank, comprising the steps of:
    connecting a liquid hydrogen line to said cryotank for transferring hydrogen therethrough;
    connecting a gas return line between said cryotank and said storage tank for safety purposes, said gas return line being used for removal of hydrogen gas from said cryotank;
    opening said gas return line to reduce the pressure in said cryotank prior to commencement of a hydrogen transferring step;
    transferring hydrogen at a pressure and a temperature corresponding to an undercooled state of liquid hydrogen from said storage tank through said liquid hydrogen line to said cryotank, said undercooled state of said liquid hydrogen being sufficient to reduce the vaporization of the hydrogen caused by thermal energy introduced into the hydrogen during transfer to the cryotank to such a degree, that under normal conditions, no hydrogen gas has to be removed from said cryotank;
    closing said gas return line during said hydrogen transferring step;
    connecting said liquid hydrogen line to said gas return line by a short-circuit line opening said gas return line after said hydrogen transferring step; and
    cooling said liquid hydrogen line, said short-circuit line and said gas return line with hydrogen flowing through said lines during the intervals between filling events.

2. The method of claim 1, wherein the hydrogen flows through said lines continuously during periods when hydrogen is not being transferred from said storage tank to said cryotank.

3. The method of claim 1, wherein the hydrogen flows through said lines in intervals during periods when hydrogen is not being transferred from said storage tank to said cryotank.

4. The method of claim 1, wherein the hydrogen flowing through said lines during periods when hydrogen is not being transferred from said storage tank to said cryotank is cooled prior to re-entering said storage tank.

5. The method of claim 1, wherein the pressure in said cryotank is reduced to atmospheric pressure prior to hydrogen transfer.

6. The method of claim 1, wherein the hydrogen is transferred to said cryotank by refuelling means which are constantly kept cold.

7. The method of claim 1, wherein after said step of transferring the hydrogen is complete, the hydrogen in said cryotank has a pressure and a temperature corresponding to a second undercooled state of liquid hydrogen.

8. The method of claim 1, wherein the hydrogen is transferred to said cryotank in the form of hydrogen sludge.

9. The method of claim 8, wherein the pressure in said cryotank is reduced to atmospheric pressure prior to hydrogen transfer.

10. The method of claim 1, wherein said liquid hydrogen is brought to said first undercooled state by using a cooling unit.

11. The method of claim 10, wherein the pressure in said cryotank is reduced to atmospheric pressure prior to hydrogen transfer.

12. The method of claim 10, wherein the hydrogen is transferred to said cryotank by a liquid hydrogen pump.

* * * * *